United States Patent [19]

Dehoff et al.

[11] Patent Number: 4,834,929
[45] Date of Patent: May 30, 1989

[54] METHOD OF MAKING MOLDS

[75] Inventors: William A. Dehoff; Hugh T. Dehoff; Chris A. Dehoff, all of Hanover, Pa.

[73] Assignee: 3D Manufacturing, Inc., Hanover, Pa.

[21] Appl. No.: 80,709

[22] Filed: Aug. 3, 1987

[51] Int. Cl.⁴ .............. B29C 39/12; B29C 33/58; B29C 67/18

[52] U.S. Cl. .................. 264/226; 264/220; 264/255; 264/256; 264/257; 264/275; 264/338; 425/3; 425/DIG. 33; 249/3; 249/91; 249/115; 249/134

[58] Field of Search .............. 264/219, 220, 225, 226, 264/227, 129, 130, 134, 137, 135, 136, 337, 338, 339, DIG. 57, 241, 257, 258, 271.1, 250, 275, 46.4, 255, 256; 425/DIG. 33, 3; 249/3, 91, 114, 115, 134, 56

[56] References Cited

U.S. PATENT DOCUMENTS

| | | | |
|---|---|---|---|
| 2,324,990 | 7/1943 | Carter | 18/47 |
| 2,441,695 | 5/1948 | Feagin . | |
| 2,615,229 | 10/1952 | Blackburn . | |
| 3,215,763 | 11/1965 | Buerger | 264/220 |
| 3,239,590 | 3/1966 | Trimble | 264/255 |
| 3,248,758 | 5/1966 | Schmitz | 425/DIG. 33 |
| 3,248,758 | 5/1966 | Schmitz et al. | 18/42 |
| 3,295,818 | 1/1967 | Kreier, Jr. . | |
| 3,387,351 | 6/1968 | Roosen . | |
| 3,388,203 | 6/1968 | Meininger et al. | 264/225 |
| 3,419,646 | 12/1968 | Smith | 264/32 |
| 3,427,689 | 2/1969 | Windecker | 18/47 |
| 3,431,331 | 3/1969 | Pincus et al. | 264/45 |
| 3,475,265 | 10/1969 | Santry . | |
| 3,652,755 | 3/1972 | Iorns . | |
| 3,686,815 | 9/1972 | Van Bose | 425/DIG. 33 |
| 3,739,051 | 6/1973 | Smith | 264/48 |
| 3,839,521 | 10/1974 | Robinson | 264/219 |
| 3,844,527 | 10/1974 | Scott | 249/189 |
| 3,931,098 | 1/1976 | Herweg et al. | 264/45.3 |
| 3,981,654 | 9/1976 | Rood et al. | 425/115 |
| 4,034,853 | 8/1977 | Saladino | 156/94 |
| 4,043,853 | 8/1977 | Saladino . | |
| 4,242,406 | 12/1980 | El Bouhnini et al. | 428/236 |
| 4,411,723 | 10/1983 | Takeuchi . | |
| 4,509,358 | 4/1985 | Krowl . | |
| 4,536,364 | 8/1985 | Lindskog | 264/227 |
| 4,601,867 | 7/1986 | Martell et al. | 264/227 |
| 4,656,722 | 4/1987 | Armstrong | 29/527.2 |
| 4,673,542 | 6/1987 | Wigner | 425/DIG. 33 |

FOREIGN PATENT DOCUMENTS

| | | | |
|---|---|---|---|
| 37-17370 | 1/1962 | Japan | 264/220 |
| 103159 | 4/1959 | Norway | 264/220 |
| 1425474 | 10/1976 | United Kingdom | 425/DIG. 33 |

OTHER PUBLICATIONS

Wills, J. A., "Glass Fiber Auto Body Construction Simplified", Dan R. Post Pub., Arcadia, Cal., pp. 44, 52 (1965).

*Primary Examiner*—Jan H. Silbaugh
*Assistant Examiner*—Jeremiah F. Durkin, II
*Attorney, Agent, or Firm*—Robert F. Palermo

[57] ABSTRACT

A method of making precision low cost molds by applying a plurality of layers of material to a pattern. The method includes providing a pattern of the part to be formed; orienting the pattern on a surface plate in a molding dam; applying a release coating to the surfaces; applying a thin resin layer to form the mold surface; applying a layer of fiber reinforced tooling resin to the thin resin layer; applying an epoxy-dry plaster bonding layer to the tooling resin; inserting a reinforcement framework into the dam; and applying bulk casting plaster to complete the body of the mold.

8 Claims, 2 Drawing Sheets

METHOD OF MAKING MOLDS

BACKGROUND OF THE INVENTION

This invention relates to a method of building low cost tooling and to a method of forming low cost precision plastic panels therein having excellent reproducibility and surface finish. The mold-building technique provides accurate molds which can be made at low cost, which provide means for placement of load-spreading metal attachment inserts, and which provide dimensional precision using low capacity clamping means when used with the subject part forming method. The part-forming technique provides large thinwall panels having excellent dimensional accuracy, excellent surface finish, and no warpage. Because of the technique of forming the panels by foamingin-place of a reactive polyurethane-chopped glass fiber mixture; this process permits design of low strength precision molds and, consequently, use of low clamping force presses for molding. Since they are subject to low clamping and separating forces, the molds may be manufactured allowing for accurate reproduction of surface details without concern for high strength. This provides the advantage of the present part forming/mold making system.

Manufacture of large thin wall glass fiber reinforced plastic panels generally requires high strength precision molds situated in high capacity presses to resist the enormous separating forces experienced by the mold halves during injection or resin transfer molding. This is necessitated by the relatively high viscosity at which transfer molding and injection molding are accomplished and by the high pressure required to force the resin through the narrow passages of the mold.

The present invention requires only accurate mold surfaces and sufficient, low, clamping forces to resist separating forces attributable to the foaming action of the pre-metered polyurethane foam-chopped glass fiber mixture as it expands to fill the mold. Because of this "self-expanding" mold filling feature; the reactive resin/glass fiber mixture is only "guided" by the mold to achieve the accuracy and mold-replication required by the product and, hence, does not demand the high strength and gating and riser provisions required by molds used in transfer and injection molding.

Automobile roof and door restyling panels are commonly formed from glass fiber reinforced polyester resins by spraying into an open mold. The quality of the panel produced thereby depends on the skill of the operator and may thus vary to an unacceptable degree. One advantage of the open mold spray process is that the mold need not be expensive nor possess high strength. Parts produced, however, often require excessive rework and refinishing. Resin transfer molding, cold press molding, and injection molding require high strength precision-matched mold sets but are capable of excellent reproducibility in part quality. Mold costs are high, mold construction lead times are long and the processes also require high capacity precision presses. These factors mitigate against use of the latter three processes except for very high production quantities. Since automobile restyling trends are subject to changes in tastes of consumers, it is advantageous for small manufacturers to be able to respond rapidly to such changes.

The present invention permits such rapid response at a small fraction of the cost of other processes.

BRIEF SUMMARY

MOLD MAKING

The mold making process consists of several steps beginning with a pattern waxed with mold release, buffed, and placed on a surface plate. The pattern is then coated with several layers of polyvinyl alcohol followed by a layer of polyester gelcoat. Magnetic inserts as necessary to hold metal attachment inclusions are placed at desired locations on the pattern. After the gelcoat surface is tack free, narrow crevices, tight radii, undercuts, and other areas which are not compatible with limitations of glass fiber lamination are filled with catalyzed gelcoat putty. This is followed by two layers of chopped strand glass fiber mat bonded with catalyzed polyester tooling resin. After the resin/glass fiber matrix has cured to a tack-free state, internal metal mold reinforcements integrated with external attachment projections are fabricated and set aside for the casting phase. A mixture of epoxy thixotropic plastic tooling medium such as Epoxycal 415 TM (U.S. Gypsum) and dry plaster are applied as a binder coat to provide adherence between the polyester tool surface and the bulk casting material - a dimensionally stable calcium sulfate hemi-hydrate blend of tooling gypsum cement having a short working time. Ultracal 30 TM (U.S. Gypsum) has been found to be an excellent casting material for this application. A continuous strand glass fiber veiling is pressed into the surface of the uncured epoxy dry plaster mixture followed by the reinforcing framework. The Ultracal 30 mixture is immediately poured to fill the mold dam and another layer of continuous strand glass fiber veiling is applied to prevent surface cracking. The mold is finally allowed to cure for twenty four hours and removed from the pattern.

The mating mold half is formed by repeating the foregoing steps using the mold half just made, the pattern, and a small perimeter dam. This permits an accurate match along all parting lands and limit surfaces.

By proper mold design and fabrication, it is possible to incorporate precise self-aligning features in the molds and thus to utilize low cost presses in part fabrication.

The process herein described yields all the advantages of matched-die closed-mold part fabrication at about one-fortieth (1/40) of the tool and equipment costs of competing techniques. The parts produced in this process are dimensionally stable, free of warpage, light weight, and involve a minimum of material waste. This is not always true of parts produced by competing techniques despite their high processing costs.

While the foregoing summary, describes the preferred embodiment of the invention, other combinations of materials will suggest themselves to those skilled in the arts described.

Depending on part characteristics desired and on part configuration and size, other resin systems coupled with other reinforcing and filling and extending means such as natural or man made fibers or flakes may be used in either the molds or the parts produced thereon. Such resins as silicones, epoxies, polyesters, and acrylics suggest themselves coupled with continuous strand fiber reinforcements such as glass fiber, graphite, aramid fibers, nylon, or steel wire. Flakes such as mica or glass or particles such as calcium carbonate or micro-cells (glass) may also be used as reinforcements or extenders.

Such variations from the preferred embodiments for mold making and part forming are recognized and contemplated in this disclosure.

DETAILED DESCRIPTION

MOLD MAKING

The invention is better understood with reference to the figures and the detailed description which follow. In the figures.

Figure 1:
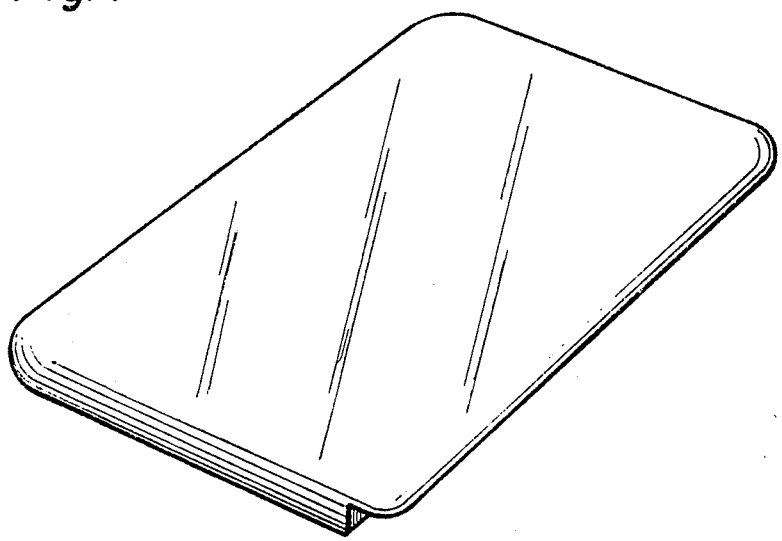
FIG. 1 is a representation of a typical plastic panel to be manufactured by this process.
Figure 2:
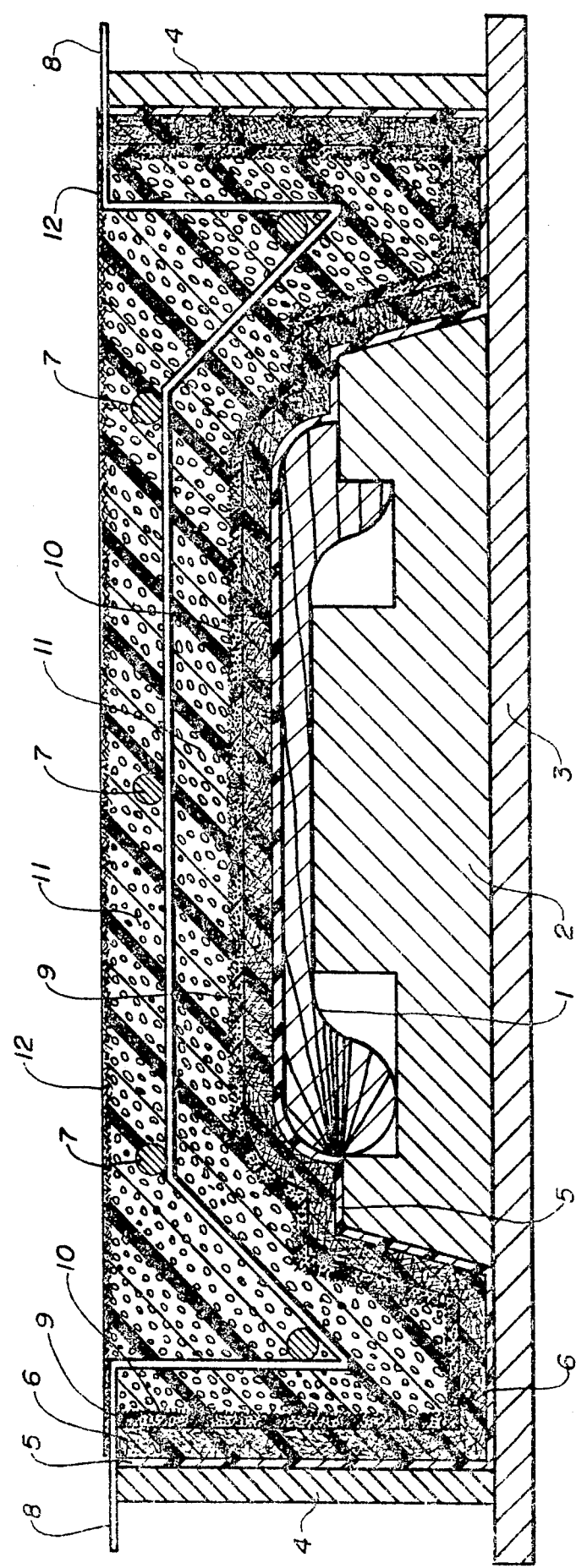
FIG. 2 is a cross section view showing the pattern on its self-aligning taper lock pedestal and surrounded on the surface plate by the plaster retaining dam in which the mold-half is formed, and showing features of the mold construction.

In accordance with a preferred embodiment of the invention, a matched set of molds for fabricating foamed-in-place glass fiber reinforced polyurethane panels were made as follows:

FIG. 1 shows a typical part to be manufactured by this process. FIG. 2 shows the pattern 1 on the taper lock pedestal 2 (which provides self-aligning mold feature) resting on surface plate 3 and surrounded by plaster retaining dam 4. All mold pattern surfaces have been coated with mold release and buffed to a high gloss. Several coats of polyvinyl alcohol are applied to produce a continuous layer over all surfaces. A layer of catalyzed polyester gelcoat 5 is applied to yield a thickness of 0.018" to 0.024". Magnetic inserts (not shown) to hold steel attachment devices for incorporation in the molded parts are now installed. After the gelcoat surface is tack free, catalyzed gelcoat putty (not shown) is applied to areas where needed to accommodate glass fiber lamination limitations. Two layers 6 of 1½ ounce chopped glass fiber mat with polyester tooling resin, catalyzed 2%, are then applied to the gelcoat surface. After the resin/glass fiber matrix has achieved a tack-free cure, fabrication of internal metal mold reinforcements 7 integrated with external attachment projections 8 can begin. The external attachment projections 8 are integrated with the internal reinforcement framework 7 to distribute loads evenly throughout the cast mold while providing means to attach mold halves to the press during part forming. The number of crossbraces and the strength of the framework are dictated by the size and complexity of the tool and the projected part run quantity. The framework is set aside until ready for the bulk casting operation.

Referring, still, to FIG. 2, a layer 9 of epoxy thixotropic plastic tooling medium such as Epoxycal 415 TM (U.S. Gypsum) mixed with dry plaster is applied as a binder coat to promote 100% adherence between the polyester tool surface and the bulk casting material. A 0.010" thick veiling 10 of continuous strand glass fiber is immediately pressed into the surface of the uncured epoxy-plaster layer 9. The reinforcing framework 7 is now placed, and care is taken to assure that external attachment projections 8 rest firmly on plaster retaining dam 4. Now the bulk casting material 11, casting material - a dimensionally stable calcium sulfate hemihydrate blend of tooling gypsum cement having a short working time. Ultracal 30 TM (U.S. Gypsum) has been found to be an excellent casting material for this application (U.S. Gypsum), is poured to completely enclose framework 7 and to fill dam 4 leaving no entrapped air to voids. A final layer 12 of 0.010" thick continuous strand glass fiber veiling is now applied to the wet plaster surface to prevent surface cracking during cure. The mold is allowed to cure for twenty four hours, removed from the pattern box, and is then used in forming the mating mold half by the same process as just described.

Figure 3:
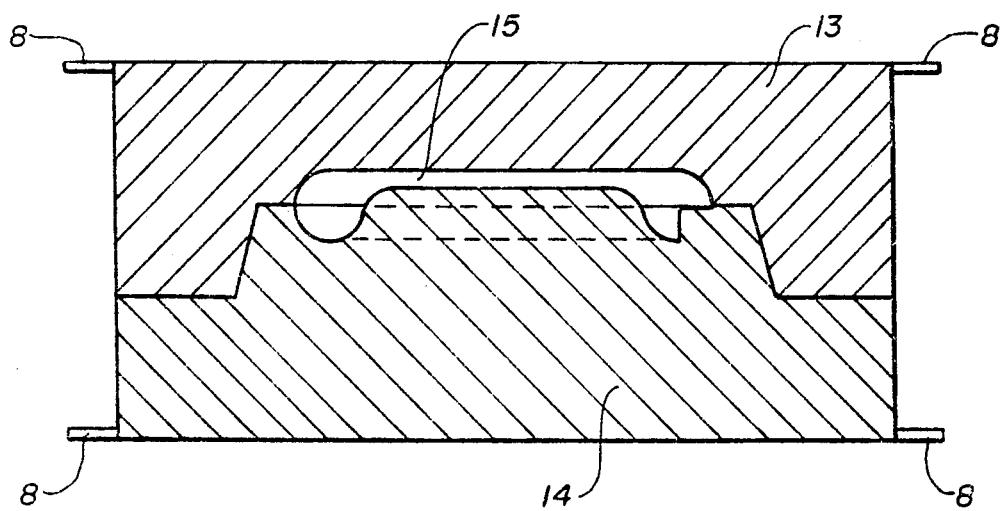
FIG. 3 is a cross sectional view of the assembled male and female mold halves showing the mold cavity for forming the part.

FIG. 3 shows the female 13 and male 14 mold halves assembled to illustrate the part forming cavity 15.

Having thus described the invention, what is claimed is:

1. A method of making a low-cost precision mold comprising the steps of providing a pattern of a product to be made in the mold; orienting said pattern on a surface plate within a plaster retaining perimeter dam; applying a release coating to the pattern, the surface plate, and the plaster retaining perimeter dam such that the finished mold may be easily separated from said pattern; applying a thin resin layer to the pattern and the surface plate to form a mold surface; placing magnetic inserts on the thin resin layer as dictated by part geometry and size, to hold load spreading metal inclusions during part molding which will provide attachment points for the finished part; applying a double layer of chopped strand glass fiber reinforced tooling resin to the thin resin layer and the magnetic inserts; curing said tooling resin for one hour; applying a layer of epoxy-dry plaster mix to the fiber reinforced tooling resin wherein said mix acts as a binder coat to adhere to both the cured tooling resin and a bulk casting plaster; immediately pressing a layer of continuous strand glass fiber veiling into the surface of the uncured epoxy-dry plaster mix to provide bonding tooth for the bulk casting plaster; inserting a metal mold-reinforcing framework with external attachment projections into the plaster retaining perimeter dam; pouring bulk casting plaster into the plater retaining perimeter dam to totally engulf the mold-reinforcing framework; and applying a final layer of continuous strand glass fiber veiling to the bulk casting plaster to prevent surface drying cracks; and allowing a sufficient time for curing and drying of the mold.

2. A method of making low cost matching closed mold sets, having a self-aligning taper lock feature, comprising the steps of providing a pattern of a product to be made in the mold; orienting said pattern on a taper lock pedestal on a surface plate within a plaster retaining perimeter dam; applying a release coating to the pattern, the surface plate, and the plaster retaining perimeter dam such that the finished mold may be easily separated from said pattern; applying a thin resin layer to the pattern and the surface plate to form a mold surface; placing magnetic inserts on the thin resin layer as dictated by part geometry and size, to hold load spreading metal inclusions during part molding which will provide attachment points for the finished part; applying a double layer of chopped strand glass fiber reinforced tooling resin to the thin resin layer and the magnetic inserts; curing said tooling resin for one hour; applying a layer of epoxy-dry plaster mix to the fiber reinforced tooling resin wherein said mix acts as a binder coat to adhere to both the cured tooling resin and a bulk casting plaster; immediately pressing a layer of continuous strand glass fiber veiling into the surface of the uncured epoxy-dry plaster mix to provide bonding tooth for the bulk casting plaster; inserting a metal mold-reinforcing framework with external attachment projections into the plaster retaining perimeter dam; pouring bulk casting plaster into the plaster retaining perimeter dam to totally engulf the mold-reinforcing framework; and applying a final layer of continuous strand glass fiber veiling to the bulk casting plaster to prevent surface drying cracks; and allowing a sufficient time for curing and drying of the mold; orienting the fully cured mold on a support plate; placing the pattern on the cured mold to define a part forming cavity; placing a plaster retention dam at the edges of the mold; applying a mold release coating to the pattern, the cured mold, and the plaster retaining perimeter dam such that the finished mold may be easily separated from said pattern; applying a thin resin layer to form a mold surface; applying a double layer of chopped strand glass fiber reinforced tooling resin to the thin resin layer; curing said tooling resin for one hour; applying a layer of epoxy-dry plaster mix to the fiber reinforced tooling resin wherein said mix acts as a binder coat to adhere to both the cured tooling resin and a bulk casting plaster; immediately pressing a layer of continuous strand glass fiber veiling into the surface of the uncured epoxy-dry plaster mix to provide bonding tooth for the bulk casting plaster; inserting a metal mold-reinforcing framework with external attachment projections into the perimeter dam; pouring bulk casting plaster into the plaster retaining perimeter dam to totally engulf the mold-reinforcing framework; and applying a final layer of continuous strand glass fiber veiling to the bulk casting plaster to prevent surface drying cracks; and allowing sufficient time for complete curing and drying of the mold.

3. A method of making a low-cost presision mold comprising the steps of providing a pattern of a product to be made in the mold; orienting said pattern on a surface plate within a plaster retaining perimeter dam; applying a release coating to the pattern, the surface plate, and the plaster retaining perimeter dam such that the finished mold may be easily separated from said pattern; applying a thin resin layer to the pattern and the surface plate to form a mold surface; placing magnetic inserts on the thin resin layer as dictated by part geometry and size, to hold load spreading metal inclusions during part molding which will provide attachments points for the finished part; applying a double layer of chopped strand glass fiber reinforced tooling resin to the thin resin layer and the magnetic inserts; curing said tooling resin for one hour; applying a layer of epoxy-dry plaster mix to the fiber reinforced tooling resin wherein said mix acts as a binder coat to adhere to both the cured tooling resin and a bulk casting plaster; immediately pressing a layer of fibrous reinforcement into the surface of the uncured epoxy-dry plaster mix to provide bonding tooth for the bulk casting plaster; inserting a metal mold-reinforcing framework with external attachment projections into the plaster retaining perimeter dam; pouring bulk casting plaster into the plaster retaining perimeter dam to totally engulf the mold-reinforcing framework; and applying a final layer of fibrous reinforcement to the bulk casting plaster to prevent surface drying cracks; and allowing a sufficient time for curing and dyring of the mold.

4. The method of claim 1 where the resin layer which forms the mold surface is a resin selected from the group consisting of polyester gelcoat resins, silicone resins, acrylic resins, and epoxies.

5. The method of claim 1, where the epoxy-dry plaster mix consists of an epoxy thixotropic tooling medium mixed with dry plaster.

6. The method of claim 1, wherein the bulk casting plaster consists of a dimensionally stable calcium sulfate hemihydrate blend of tooling gypsum cement having a short working time.

7. The method of claim 1, where the bulk casting plaster is filled or extended with large hard particles selected from the group consisting of gravel, concrete chunks, and metal chunks.

8. The method of claim 1, wherein the fibrous reinforecment is selected from the group consisting of aramid fiber cloth, graphite fiber matting, expanded metal, wire screening, and metal felt.

* * * * *